United States Patent
Ashwood-Smith

(10) Patent No.: US 10,425,319 B2
(45) Date of Patent: Sep. 24, 2019

(54) TRANSPORT SOFTWARE DEFINED NETWORKING (SDN)—ZERO CONFIGURATION ADJACENCY VIA PACKET SNOOPING

(71) Applicant: Huawei Technologies Co., Ltd., Shenzhen (CN)

(72) Inventor: Peter Ashwood-Smith, Gatineau (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/718,941

(22) Filed: May 21, 2015

(65) Prior Publication Data
US 2016/0344607 A1  Nov. 24, 2016

(51) Int. Cl.
| | |
|---|---|
| *H04L 12/26* | (2006.01) |
| *H04L 12/24* | (2006.01) |
| *H04L 12/721* | (2013.01) |

(52) U.S. Cl.
CPC .......... *H04L 43/12* (2013.01); *H04L 41/0213* (2013.01); *H04L 43/50* (2013.01); *H04L 45/26* (2013.01)

(58) Field of Classification Search
None
See application file for complete search history.

(56) References Cited

U.S. PATENT DOCUMENTS

| | | | |
|---|---|---|---|
| 6,757,258 B1 | 6/2004 | Pillay-Esnault | |
| 7,903,554 B1 * | 3/2011 | Manur | H04L 45/026 370/230.1 |
| 8,014,278 B1 | 9/2011 | Subramanian et al. | |

(Continued)

FOREIGN PATENT DOCUMENTS

| | | |
|---|---|---|
| CN | 101843045 A | 9/2010 |
| CN | 102158348 A1 | 8/2011 |

(Continued)

OTHER PUBLICATIONS

Partial English Translation and Abstract of Chinese Patent Application No. CN104320345, Aug. 22, 2016, 5 pages.

(Continued)

*Primary Examiner* — Chirag G Shah
*Assistant Examiner* — Suk Jin Kang
(74) *Attorney, Agent, or Firm* — Conley Rose, P.C.

(57) ABSTRACT

A transport software defined networking (SDN) controller comprising a receiver and a processor coupled to the receiver. The processor is configured to cause the transport SDN controller to determine a physical topology based on physical layer adjacency discovery messages received from physical layer network elements (NEs), receive advertisement messages from the physical layer NEs, each advertisement message comprising a mapping between an adjacent network layer NE and a port of the associated physical layer NE, extract a network layer adjacency request from some of the advertisement messages indicating a first network layer NE is requesting a network layer connection with a second network layer NE, and setup a physical layer connection between the first network layer NE and the second network layer NE based on the network layer adjacency request, the advertisement messages, and the physical topology.

18 Claims, 6 Drawing Sheets

(56) References Cited

U.S. PATENT DOCUMENTS

| | | | |
|---|---|---|---|
| 8,243,594 | B1 | 8/2012 | Fotedar et al. |
| 8,942,256 | B1 | 1/2015 | Barth et al. |
| 9,225,597 | B2* | 12/2015 | Tubaltsev .............. H04L 45/02 |
| 9,300,592 | B2 | 3/2016 | Macchiano et al. |
| 9,450,817 | B1* | 9/2016 | Bahadur ................ H04L 45/64 |
| 9,590,901 | B2* | 3/2017 | Tubaltsev ............ H04L 45/586 |
| 9,641,249 | B2 | 5/2017 | Kaneriya et al. |
| 9,819,540 | B1* | 11/2017 | Bahadur ............. H04L 41/0813 |
| 9,860,350 | B2 | 1/2018 | Ashwood-Smith |
| 2002/0118647 | A1 | 8/2002 | Maeno |
| 2002/0196494 | A1 | 12/2002 | McGuire, Jr. |
| 2006/0221865 | A1 | 10/2006 | Hawbaker et al. |
| 2009/0087184 | A1 | 4/2009 | Gao et al. |
| 2011/0267941 | A1 | 11/2011 | Bitar |
| 2011/0299536 | A1 | 12/2011 | Cheng et al. |
| 2012/0030345 | A1 | 2/2012 | Mahadevan et al. |
| 2012/0033665 | A1 | 2/2012 | Da Silva et al. |
| 2012/0230185 | A1 | 9/2012 | Yong |
| 2013/0121141 | A1 | 5/2013 | Hao |
| 2013/0250829 | A1 | 9/2013 | Kurokawa |
| 2013/0286846 | A1 | 10/2013 | Atlas et al. |
| 2013/0301407 | A1 | 11/2013 | Zhou et al. |
| 2013/0336317 | A1 | 12/2013 | Mithyantha et al. |
| 2014/0119367 | A1* | 5/2014 | Han ................... H04L 12/4633 370/389 |
| 2014/0241372 | A1* | 8/2014 | Chen ..................... H04L 45/02 370/400 |
| 2014/0254427 | A1* | 9/2014 | Chen ..................... H04L 45/02 370/254 |
| 2014/0301401 | A1 | 10/2014 | Wang et al. |
| 2014/0325038 | A1* | 10/2014 | Kis ..................... H04L 41/0803 709/220 |
| 2014/0355615 | A1 | 12/2014 | Chang |
| 2014/0362709 | A1* | 12/2014 | Kashyap ................ H04L 41/12 370/250 |
| 2015/0019712 | A1 | 1/2015 | Senthilkumar |
| 2015/0043378 | A1* | 2/2015 | Bardgett ............ H04L 12/4641 370/254 |
| 2015/0043589 | A1* | 2/2015 | Han ...................... H04L 45/38 370/392 |
| 2015/0063802 | A1* | 3/2015 | Bahadur ............. H04L 47/125 398/49 |
| 2015/0103844 | A1* | 4/2015 | Zhao .................... H04L 45/42 370/410 |
| 2015/0104166 | A1* | 4/2015 | Patel ................. H04Q 11/0066 398/5 |
| 2015/0109902 | A1* | 4/2015 | Kumar ............... H04L 41/0668 370/219 |
| 2015/0110107 | A1 | 4/2015 | Ishizuka et al. |
| 2015/0117451 | A1 | 4/2015 | Kaberiya |
| 2015/0139036 | A1* | 5/2015 | Liu ...................... H04L 45/02 370/255 |
| 2015/0163094 | A1 | 6/2015 | Maggiari et al. |
| 2015/0188731 | A1 | 7/2015 | Daly |
| 2015/0200838 | A1* | 7/2015 | Nadeau ............... H04L 45/124 398/58 |
| 2015/0220740 | A1* | 8/2015 | Patel .................... H04L 67/10 726/26 |
| 2015/0244605 | A1 | 8/2015 | Grandi et al. |
| 2015/0244607 | A1* | 8/2015 | Han ..................... H04L 45/02 370/254 |
| 2015/0281072 | A1* | 10/2015 | Arumugam ........... H04L 45/245 370/392 |
| 2015/0350059 | A1* | 12/2015 | Chunduri ............... H04L 45/18 370/238 |
| 2015/0381428 | A1* | 12/2015 | Ong .................... H04L 41/12 709/223 |
| 2016/0006609 | A1* | 1/2016 | Zhao ................. H04L 41/0816 370/254 |
| 2016/0006614 | A1* | 1/2016 | Zhao ................... H04L 45/50 370/254 |
| 2016/0014023 | A1* | 1/2016 | He ....................... H04L 45/64 370/408 |
| 2016/0028602 | A1 | 1/2016 | Mishra et al. |
| 2016/0050156 | A1* | 2/2016 | Bergeron ................ H04L 47/41 370/235 |
| 2016/0062746 | A1* | 3/2016 | Chiosi ...................... G06F 8/35 717/104 |
| 2016/0072696 | A1* | 3/2016 | He ......................... H04L 45/021 370/254 |
| 2016/0156480 | A1 | 6/2016 | Liu |
| 2016/0156545 | A1* | 6/2016 | Csaszar ................ H04L 45/021 370/238 |
| 2016/0164739 | A1* | 6/2016 | Skalecki ............. H04L 41/0896 370/389 |
| 2016/0182400 | A1* | 6/2016 | Ceccarelli ............. H04L 47/783 370/437 |
| 2016/0182982 | A1* | 6/2016 | Schmidtke ......... H04Q 11/0005 398/51 |
| 2016/0197824 | A1 | 7/2016 | Lin et al. |
| 2016/0241467 | A1* | 8/2016 | Gunasekaran .......... H04L 45/42 |
| 2016/0248664 | A1* | 8/2016 | Huang .................. H04L 45/64 |
| 2016/0269272 | A1* | 9/2016 | Li .......................... H04L 67/327 |
| 2016/0315866 | A1* | 10/2016 | Thapar ................. H04L 47/2408 |
| 2016/0344715 | A1* | 11/2016 | Kumar .................. H04L 63/126 |
| 2016/0359735 | A1* | 12/2016 | Zhao ...................... H04L 45/42 |
| 2017/0295089 | A1* | 10/2017 | Saltsidis ............... H04L 45/245 |

FOREIGN PATENT DOCUMENTS

| | | |
|---|---|---|
| CN | 103501236 A | 1/2014 |
| CN | 104283722 A | 1/2015 |
| CN | 104283791 A | 1/2015 |
| CN | 104283802 A | 1/2015 |
| CN | 104320345 A | 1/2015 |
| CN | 104426766 A | 3/2015 |
| CN | 104471906 A | 3/2015 |
| CN | 104754025 A | 7/2015 |
| EP | 2814213 A1 | 12/2014 |
| EP | 2843888 A1 | 3/2015 |
| JP | 2000216815 A | 8/2000 |
| JP | 2001060956 A | 3/2001 |
| JP | 2006157102 A | 6/2006 |
| JP | 2011135280 A | 7/2011 |
| JP | 2013535922 A | 9/2013 |
| JP | 2014170985 A | 9/2014 |
| JP | 2015056836 A | 3/2015 |
| KR | 20150067361 A | 6/2015 |
| WO | 2004032562 A1 | 4/2004 |
| WO | 2011147373 A1 | 12/2011 |
| WO | 2012066625 A1 | 5/2012 |
| WO | 2014054281 A1 | 4/2014 |
| WO | 2014074541 A2 | 5/2014 |
| WO | 2015051856 A1 | 4/2015 |

OTHER PUBLICATIONS

Foreign Communication From a Counterpart Application, PCT Application No. PCT/CN2016/078734, International Search Report dated Jun. 29, 2016, 7 pages.

Foreign Communication From a Counterpart Application, PCT Application No. PCT/CN2016/078734, Written Opinion dated Jun. 29, 2016, 4 pages.

Haleplidis, Ed., et al., "Software-Defined Networking (SDN): Layers and Architecture Terminology," RFC 7426, Jan. 2015, 36 pages.

Foreign Communication From a Counterpart Application, PCT Application No. PCT/CN2016/078735, International Search Report dated Jul. 6, 2016, 7 pages.

Foreign Communication From a Counterpart Application, PCT Application No. PCT/ CN2016/078735, Written Opinion dated Jul. 6, 2016, 4 pages.

Foreign Communication From a Counterpart Application, PCT Application No. PCT/CN2016/078863, International Search Report dated Jul. 14, 2016, 7 pages.

Foreign Communication From a Counterpart Application, PCT Application No. PCT/CN2016/078863, Written Opinion dated Jul. 14, 2016, 4 pages.

Office Action dated Oct. 6, 2016, 30 pages, U.S. Appl. No. 14/709,697, filed May 12, 2015.

(56) References Cited

OTHER PUBLICATIONS

Office Action dated Feb. 10, 2017, 22 pages, U.S. Appl. No. 14/718,949, filed May 21, 2015.
Office Action dated Aug. 24, 2017, 22 pages, U.S. Appl. No. 14/718,949, filed May 21, 2015.
Notice of Allowance dated Jan. 12, 2018, U.S. Appl. No. 14/718,949, filed May 21, 2015.
Foreign Communication From a Counterpart Application, European Application No. 16791968.7, Extended European Search Report dated Mar. 28, 2018, 11 pages.
Auster, M., et al., "OpenFlow-enabled Transport SDN," XP055467565, May 27, 2014, 16 pages.
Liu, L., et al., "Experimental demonstration of an OpenFlow/PCE integrated control plane for IP over translucent WSON with the assistance of a per-request-based dynamic topology server," XP002734579, Feb. 25, 2013, 12 pages.
Foreign Communication From a Counterpart Application, European Application No. 16795757.0, Extended European Search Report dated Apr. 24, 2018, 10 pages.
Foreign Communication From a Counterpart Application, European Application No. 16795759.6, Extended European Search Report dated Feb. 19, 2018, 9 pages.
Puneet, S., et al., "Enhancing Network Management Frameworks with SDN-like Control" XP055569119, Integrated Network Management Mar. 2013, pp. 688-691.
Foreign Communication From a Counterpart Application, European Application No. 16795757.0, European Office Action dated Mar. 21, 2019, 9 pages.
Machine Translation and Abstract of Japanese Publication No. JP2000216815, Aug. 4, 2000, 17 pages.
Machine Translation and Abstract of Japanese Publication No. JP2001060956, Mar. 6, 2001, 13 pages.
Machine Translation and Abstract of Japanese Publication No. JP2006157102, Jun. 15, 2006, 22 pages.
Machine Translation and Abstract of Japanese Publication No. JP2011135280, Jul. 7, 2011, 32 pages.
Machine Translation and Abstract of Japanese Publication No. JP2013535922, Sep. 12, 2013, 36 pages.
Machine Translation and Abstract of Japanese Publication No. JP2014170985, Sep. 18, 2014, 31 pages.
Machine Translation and Abstract of Japanese Publication No. JP2015056836, Mar. 23, 2015, 61 pages.
Foreign Communication From a Counterpart Application, Japanese Application No. 2017-560714, Japanese Office Action dated Nov. 26, 2018, 2 pages.
Foreign Communication From a Counterpart Application, Japanese Application No. 2017-560714, English Translation of Japanese Office Action dated Nov. 26, 2018, 3 pages.
Foreign Communication From A Counterpart Application, Chinese Application No. 104283802, Jan. 14, 2015, 21 pages.
Foreign Communication From A Counterpart Application, Chinese Application No. 201680028883.4, Chinese Office Action dated Jul. 2, 2019, 19 pages.
Foreign Communication From A Counterpart Application, Chinese Application No. 201680029401.7, Chinese Office Action dated Jun. 18, 2019, 5 pages.

* cited by examiner

TRANSPORT SOFTWARE DEFINED NETWORKING (SDN)—ZERO CONFIGURATION ADJACENCY VIA PACKET SNOOPING

TECHNICAL FIELD

The present invention relates to a system and method for transport network communications, and, in particular, to a system and method for physical layer network configuration.

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g. data plane) is decoupled from control decisions (e.g. control plane), such as routing, resources and other management functionalities in a centrally-controlled network. The decoupling also allows the data plane and the control plane to operate on different hardware, in different runtime environments, and/or operate using different models. In the centrally-controlled network, network intelligence is logical centralized in software-based controllers. Thus, network devices become packet forwarding devices that are managed and controlled by the centralized controllers.

SUMMARY

A transport software defined networking (SDN) controller is disclosed herein. In one embodiment, the transport SDN controller may comprise a receiver and a processor coupled to the receiver. The processor may be configured to cause the transport SDN controller to determine a physical topology based on physical layer adjacency discovery messages received from physical layer network elements (NEs) and receive advertisement messages from the physical layer NEs, each advertisement message comprising a mapping between an adjacent network layer NE and a port of the associated physical layer NE. The transport SDN controller may further extract a network layer adjacency request from some of the advertisement messages indicating a first network layer NE is requesting a network layer connection with a second network layer NE and setup a physical layer connection between the first network layer NE and the second network layer NE based on the network layer adjacency request, the advertisement messages, and the physical topology.

In another embodiment, the disclosure includes a method implemented in a physical layer network packet interface card. The method may comprise receiving a bit stream comprising network layer messages, inspecting the network layer messages to determine a network layer adjacency request indicating a first network layer NE is requesting a network layer connection with a second network layer NE, and advertising the network layer adjacency request to a transport software defined networking (SDN) controller to support creation of a transport layer connection between physical layer NE ports to implement a network layer connection between the first network layer NE and the second network layer NE, wherein the network packet interface card is not configured to modify header information contained in messages forwarded across the network packet interface card.

In another embodiment, the disclosure includes a method implemented by a transport software defined networking (SDN) controller. The method may comprise receiving physical layer adjacency discovery messages from physical layer network elements (NEs) that indicate physical layer port adjacency information, determining a physical topology based on the physical layer adjacency discovery messages, receiving advertisement messages from the physical layer NEs, each advertisement message indicating a mapping between a physical layer NE port and an adjacent network layer NE, some of the advertisement messages comprising a network layer adjacency request indicating a first network layer NE is requesting a network layer connection with a second network layer NE, and setting up a network layer connection between the first network layer NE and the second network layer NE based on the network layer adjacency request, the advertisement messages, and the physical topology.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
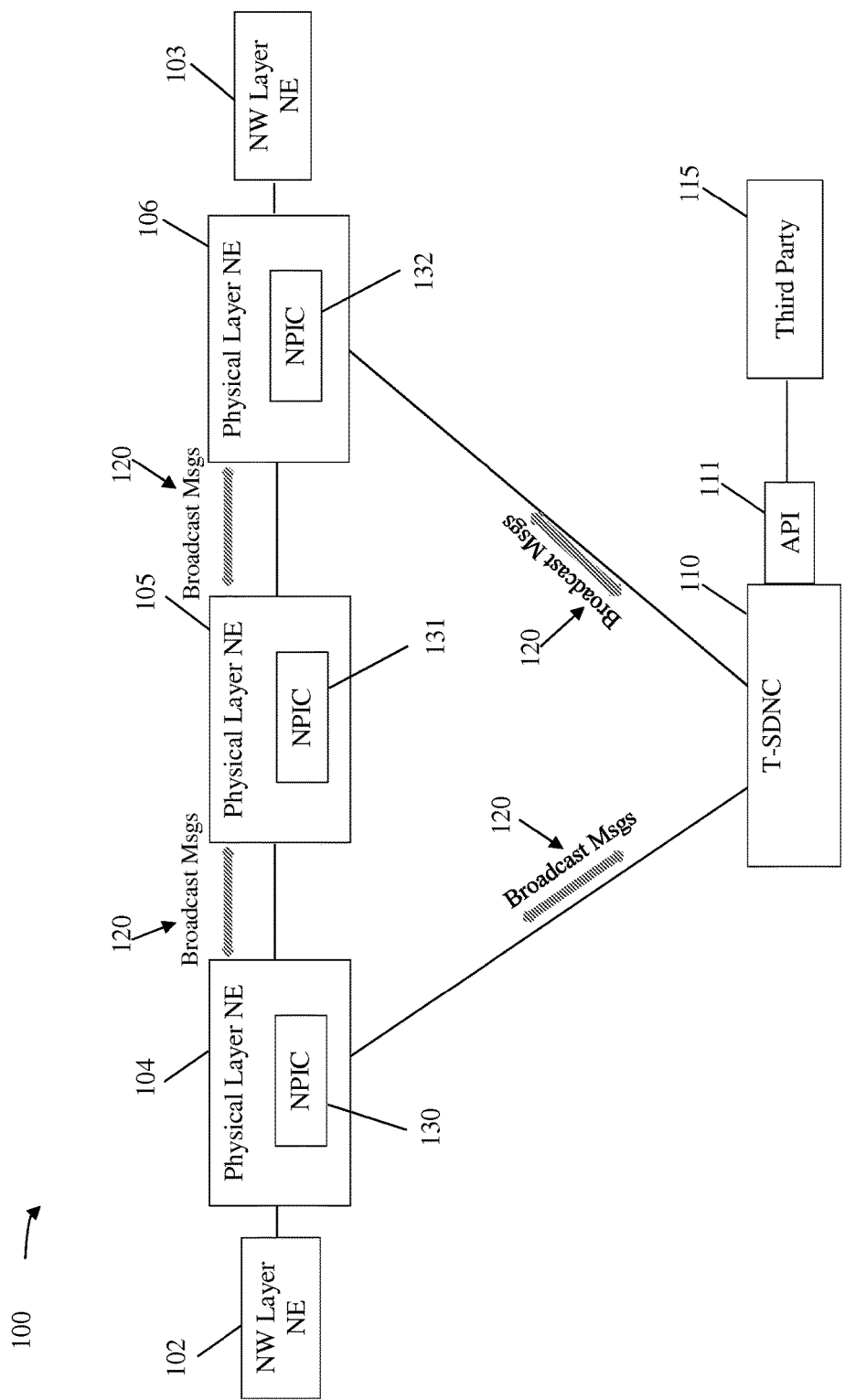
FIG. 1 is a schematic diagram of an embodiment of a communication network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some networks, data flows are defined by the placement and configuration of routers and switches in a network. Subsequent changes to the routers and/or switches may be expensive as physical location and/or hardware changes may require manual configurations. Software defined networking (SDN) is a networking paradigm, where the management of data flow (e.g. control plane) and the delivery of data (e.g. data plane) are decoupled, which creates a flexible network through dynamic management and control. In an SDN network, network devices (e.g. routers and/or switches) are controlled and managed by one or more SDN controllers (SDNCs). An SDNC is any device configured to control and manage an SDN domain. The SDNCs make routing decisions and then communicate the routing decisions to the network devices via control messages. For example, the SDNCs compute the best paths for routing packets from one node to another node based on some network topology information and then download route tables, switching tables, or flow tables to all network devices along the best path. Then, the network devices perform data forwarding functions according to the route tables received from the SDNCs. The SDNCs also modify the behavior of an SDN network dynamically to adapt to changes in the network (e.g. infrastructure changes, new applications and/or services deployment, and/or business requirement changes).

Network transport layers include layer 0 (e.g., dense wavelength division multiplexing (DWDM), photonics) and open systems interconnection (OSI) layer 1 (e.g., synchronous optical network (SoNET)/synchronous digital hierarchy (SDH) and optical transport network (OTN)). Accordingly, transport SDNCs (T-SDNCs) operate at layers 0 and 1. It is desirable to automatically set up a transport layer connection to implement a layer 3 (network layer) connection when a layer 3 connection is configured.

Disclosed herein are mechanisms for automatically configuring transport layer connections to implement network layer connections. For example, a physical layer network element receives bit streams comprising network layer adjacency request messages and network layer maintenance messages. The physical layer network element comprises a plurality of physical ports. The physical layer network element inspects header information of each of the network layer adjacency request messages to determine a mapping between an adjacent network layer network element and a physical layer network element port. The physical layer network element also inspects the header information of each of the network layer adjacency request messages to determine network adjacency request information indicating a first network layer network element is requesting a network layer connection with a second network layer network element. Physical layer network elements then broadcast network layer adjacency request information and determine mappings of network layer network elements and adjacent physical layer network element ports at the physical layer.

Network devices at the physical layer, including at least one T-SDNC, receive the advertisement messages. A T-SDNC makes switching decisions but does not make routing decisions. The T-SDNC receives physical layer adjacency discovery messages from physical layer network elements that indicate physical layer port adjacency information. The T-SDNC determines a physical topology based on inspecting the physical layer adjacency discovery messages. The T-SDNC receives network layer adjacency discovery messages from network layer network elements. The T-SDNC determines a logical topology based on inspecting the network layer adjacency discovery messages, including whether or not a network layer connection exists between two network layer network elements. The T-SDNC then sets up physical layer connections between physical layer network element ports to implement requested network layer connections between network layer network elements based on the determined physical topology, the determined logical topology, the received network layer adjacency requests, and/or the received advertisement message mappings. Similarly, the T-SDNC automatically deletes physical layer connections between physical layer network element ports upon determining a deletion has been requested at the network layer based on a determined physical topology, received network layer adjacency requests, and/or received advertisement message mappings. Thus, addition or deletion of network layer connections between network layer network elements can be automatically configured at the transport layer by the T-SDNC (e.g., without requiring manual configuration by system administrators) by adding or deleting corresponding physical layer connections between physical layer network element ports. A layer of operations staff may be removed, and thus operation costs and operation errors may be reduced.

FIG. 1 is a schematic diagram of an embodiment of a communication network 100. Network 100 comprises a plurality of physical layer network elements (NEs) 104, 105, and 106, a plurality of network (NW) layer NEs 102-103, and one or more transport software defined networking controllers (T-SDNCs) 110 comprising an application programming interface (API) 111. The physical layer NEs 104-106 are communicatively coupled via optical and/or electrical links. The T-SDNC 110 is communicatively coupled to the physical layer NEs 104-106 via optical links, electrical links, or combinations thereof. The network layer NEs 102-103 are communicatively coupled to the physical layer NEs 104-106 via optical links, electrical links, or combinations thereof. The network layer NEs 102-103 may be any physical device (e.g. router) or logical device configured to perform data packet forwarding functions inside a network domain and/or between network domains. The network layer NEs 102-103 operate at the network layer of the OSI model. Connections and/or other links shown in FIG. 1 include physical connections, such as fiber optic links, electrical links, wireless links, and/or logic connections. The connections each comprises a single link, a series of parallel links, a plurality of interconnected nodes, and/or various combinations thereof used to transport data between network devices.

The physical layer NEs 104-106 may be any physical device (e.g. switch) configured to perform data forwarding functions according to SDN routes specified by T-SDNC(s) 110 in an SDN domain. The physical layer NE 104 comprises one or more physical ports (e.g. port 215, 216, 310, or 311), a network packet interface card (NPIC) 130, 131, and 132, respectively, and a processor. The processor is coupled to the network packet interface card and is configured to perform a variety of functions. In an embodiment, the physical layer NE 104 performs functions of an optical switch. An upstream port is mapped to a downstream port by the physical layer NE 104. For example, wavelengths may be routed from an upstream port to a mapped downstream port by the physical layer NE 104. For example, wavelengths are routed from the network packet interface card 130 to the link between the physical layer NEs 104 and 105, then through the link between the physical layer NEs 105 and 106, and finally to the network packet interface card 132. The wavelengths are further routed from the network packet interface card 132 to a destination, e.g., via the network layer NE 103. The network packet interface card 130 and the processor may not be configured to modify header information contained in messages, for example a header contained in broadcast messages 120, forwarded across the network packet interface card 130. Said in other words, the physical layer NE 104 forwards an encoded data packet from a first port to a second port without making modification to a header of the encoded data packet.

The network packet interface card 130 receives bit streams comprising broadcast messages 120 (e.g., adjacency discovery messages and network layer maintenance messages) and/or targeted messages (e.g., network layer adjacency request messages). The adjacency discovery message or the network layer adjacency request message may be any of an open shortest path first (OSPF) message, an intermediate system to intermediate system (IS-IS) message, a border gateway protocol (BGP) message, or another type of adjacency message. The adjacency discovery message may be any of a network layer adjacency discovery message or a physical layer adjacency discovery message. The network layer adjacency discovery messages are broadcasted between communicatively coupled network layer NEs (e.g., network layer NEs 102-103) operating at the network layer of the OSI model. The network layer adjacency discovery messages comprise information of network layer NE adjacencies. Physical layer adjacency discovery messages are broadcasted between communicatively coupled physical layer NEs 104-106 operating at the physical layer of the OSI model. The physical layer adjacency discovery messages comprise information of physical layer NE 104-106 adjacencies. Network layer adjacency discovery messages and physical layer adjacency discovery messages may be broadcast periodically and/or upon occurrence of an event. For example, a network layer adjacency request message is transmitted by a first network layer NE (e.g., network layer NE 102 or 103) to indicate a request for a network layer connection between the first network layer NE to a second network layer NE. The requested network layer connection is then also implemented by a physical layer connection, for example by setting up a physical connection between adjacent physical layer NE ports of the network layer NEs.

The network packet interface card 130 inspects the network layer adjacency request messages, for example by reviewing the contents of the adjacency request messages via a snooping utility. As used herein, inspecting indicates reviewing contents of a packet traversing an interface without altering the packet, which may also be known as snooping. A network layer adjacency request message transmitted by the network layer NEs 102-103 may be a targeted OSPF hello message, a targeted IS-IS hello message, or another type of adjacency request message. For example, the network layer NE 102 may be configured to communicatively couple to another desired next hop network layer NE, for example the network layer NE 103. The network layer NE 102 transmits a network layer adjacency request indicating that a connection is desired between the network layer NE 102 and the network layer NE 103. The network layer NE 103 also transmits a network layer adjacency request indicating that a connection is desired between the network layer NE 103 and the network layer NE 102. The network layer adjacency request message comprises information of the network layer NEs, such as identifications of the network layer NEs 102 and 103. Such adjacency request messages are encoded in a bit stream and communicated between network layer NE 102 and NE network layer 103 via physical layer NEs 104-106.

For example, a header of a network layer adjacency request message is inspected by the physical layer NE 104 allowing the physical layer NE 104 to determine that a connection is requested between a first network layer NE 102 and a second network layer NE 103. A first identification of the first network layer NE 102 and a second identification of the second network layer NE 103 are obtained by the physical layer NE 104 by inspecting the header of the network layer adjacency request message. The physical layer NE 104 then transmits advertisement messages at the physical layer to broadcast the network layer request message. In an embodiment, the advertisement message may be an OSPF link state advertisement (LSA) message. For example, the NPIC 130 or the physical layer NE 104 may append the network layer adjacency request information to an OSPF LSA message. The network layer adjacency request information or the advertisement message comprises an identification of the physical layer NE 104, an identification of the first network layer NE 102, and/or an identification of the second network layer NE 103.

Headers of the network layer adjacency discovery messages passing across physical layer NEs 104-106 are also inspected by the physical layer network element 104, allowing the physical layer NE 104 to obtain adjacency information of physical layer NE ports and network layer NEs 102-103. Physical layer NE 104 employs the inspected data to determine a mapping of a physical layer NE port to an adjacent network layer NE 102. The physical layer NE 104 then transmits advertisement messages at the physical layer to broadcast the mapping of the physical layer NE port to the adjacent network layer NE 102. In an embodiment, the advertisement message may be an OSPF LSA message. For example, the NPIC 130 or the physical layer NE 104 may append the mapping information to the OSPF LSA message. The mapping information or the advertisement message comprises an identification of the physical layer NE 104, a physical port identification, and an identification of the adjacent network layer NE 102. The mapping information and the network layer adjacency request information may be transmitted by the physical layer NE 104 in the same advertisement message or in separate advertisement messages.

The T-SDNC 110 is any device configured to control and manage an SDN domain (e.g. via control messages). Each T-SDNC 110 is physically and/or logically located within an SDN domain. A third party 115 such as a system administrator may have access to the T-SDNC 110 through an application programming interface (API) 111. T-SDNCs 110 perform a variety of control plane functions that comprise generating and obtaining routing information, network topology, and/or network state information. For example, the T-SDNC 110 determines, maintains, and/or broadcasts SDN specific topology information of the SDN domain that the T-SDNC 110 manages and/or supports. Accordingly, the T-SDNC 110 receives SDN specific topology information of other SDN domains that are supported and/or managed by other SDNCs 110. Each T-SDNC 110 configures physical layer NEs 104-106 in an SDN domain that the T-SDNC 110 manages, for example, by transmitting control messages comprising flow tables to the physical layer NEs 104-106. Each T-SDNC 110 communicates with a physical layer NE 104 over a controller-device interface, which may employ any standardized protocol (e.g. the OpenFlow protocol). It should be noted that prior to advertising SDN specific topology information, each T-SDNC 110 broadcasts link state information which has been defined in interior gateway protocol (IGP).

Figure 2:
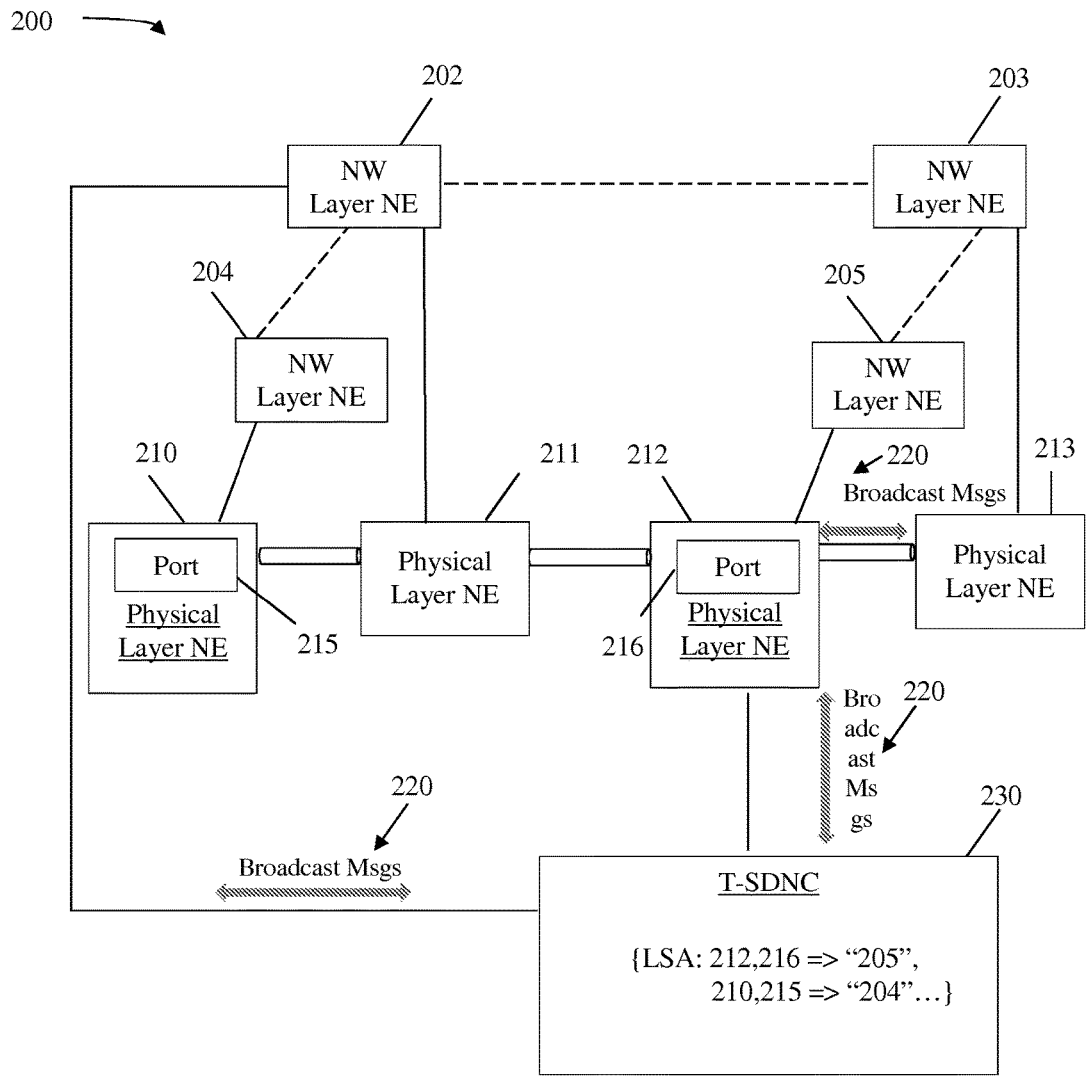
FIG. 2 is a schematic diagram of another embodiment of a communication network.

The T-SDNC 110 receives physical layer adjacency discovery messages of physical ports transmitted by physical layer NEs 104-106. For example, a physical layer adjacency discovery message (e.g. broadcast message 120) comprises an identification of a first physical layer NE 104, an identification of a first physical layer NE port of the first physical layer NE 104, an identification of a second physical layer NE 105, and/or an identification of a second physical layer NE port of the second physical layer NE 105. By reviewing the physical layer adjacency discovery messages, the T-SDNC 110 obtains information that the first and second physical layer NE ports are adjacent at the physical layer and the first and second physical layer NEs 104-105 are adjacent at the physical layer. A physical topology is determined by the T-SDNC 110 based on the physical layer adjacency discovery messages. For example, the T-SDNC 110 may build a topology based on identifications of the physical layer NE ports and physical layer NEs 104-106 in the physical layer adjacency discovery messages. For example, the T-SDNC 110 may determine a physical topology as shown in FIG. 2. The T-SDNC 110 may employ the physical topology, mappings between the physical topology and a logical topology, and/or data from the network layer adjacency requests to automatically configure physical layer connections to support the network layer adjacency request.

FIG. 2 is a schematic diagram of another embodiment of a communication network 200. Network 200 comprises network (NW) layer NEs 202, 203, 204, and 205, physical layer NEs 210, 211, 212, and 213, T-SDNC 230, and broadcast messages 220, which may be substantially similar to network layer NEs 102 and 103, physical layer NEs 104, 105, and 106, T-SDNC 110, and broadcast messages 120, respectively. The physical layer NEs 210-213 receive bit streams comprising broadcast messages 220 (e.g. adjacency discovery messages and network layer maintenance messages). The physical layer NEs 210-213 also receive bit streams comprising targeted messages (e.g. network layer adjacency request messages). The adjacency discovery message may be any of an open shortest path first (OSPF) message, an intermediate system to intermediate system (IS-IS) message, a border gateway protocol (BGP) message, or other adjacency discovery messages. The adjacency discovery message may be any of a network layer adjacency discovery message or a physical layer adjacency discovery message. The network layer adjacency discovery messages are broadcasted between communicatively coupled logical nodes (e.g. NW nodes 202-205) operating at the network layer of the OSI model and comprise information of logical node (e.g. NW nodes 202-205) adjacencies. The physical layer adjacency discovery messages are broadcasted between communicatively coupled physical layer NEs 210-213 operating at the physical layer of the OSI model and comprise information of physical layer NEs 210-213 adjacencies. The network layer adjacency request message may be any of an OSPF message, an IS-IS message, a BGP message, or other adjacency request messages. The network layer adjacency request messages are transmitted by the network layer NEs and comprise adjacency request information of the network layer NEs. The network layer adjacency request messages comprise identifications of network layer NEs 202-205 that request creation, deletion, or modification of network layer adjacencies by creation, deletion, or modification of the network layer links between the network layer NEs 202-205.

Advertisement messages from the physical layer NEs 210-213 are received at the T-SDNC 230. For example, an advertisement message transmitted by the physical layer NE 210 comprises information that the port 215 of the physical layer NE 210 is adjacent to the network layer NE 204. The advertisement message transmitted by the physical layer NE 210 may also comprise network layer adjacency request information transmitted by the network layer NE 204 for a network layer connection between the network layer NE 204 and the network layer NE 205. An advertisement message transmitted by the physical layer NE 212 comprises information that the port 216 of the physical layer NE 212 is adjacent to the network layer NE 205. The advertisement message transmitted by the physical layer NE 212 may also comprise network layer adjacency request information transmitted by the network layer NE 205 for a network layer connection between the network layer NE 205 and the network layer NE 204. Similar advertisement messages are transmitted by physical layer network elements 211 and 213. The advertisement messages are received by the T-SDNC 230, for example via a passive OSPF interface.

The T-SDNC 230 determines a physical topology of the network 200 based on the advertisement messages from the physical layer NEs. The T-SDNC 230 then sets up, deletes, and/or modifies a physical layer connection between the physical layer NE port 215 and the physical layer NE port 216 to implement a network layer connection between the network layer NE 204 and the network layer NE 205 based on the physical topology and information from the network layer adjacency requests. After the physical layer connection between the port 215 and the port 206 is set up by the T-SDNC 230, the network layer NE 204 and the network layer NE 205 can exchange network layer adjacency discovery messages and/or network layer adjacency messages to complete the setup of the network layer connection. It should be noted that the T-SDNC 230 may also determine a logical topology based on network layer advertisements and map the logical topology to the physical topology as discussed in U.S. Non-provisional application "Transport Software Defined Networking (SDN)—Logical to Physical Topology Discovery" by Peter Ashwood-Smith Ser. No. 14/709,697 filed on May 12, 2015, which is incorporated by reference. Such physical to logical topology mappings may be employed to support setting up the physical layer connection to support the network layer connection.

The physical layer connection may be set up by assigning a wavelength, sometimes referred to as a lambda ($\lambda$), and/or by assigning a time slot of associated with a signal to the physical layer NE port 215 and the physical layer NE port 216. A specific $\lambda$ may be shared between multiple physical connections via time division multiplexing (e.g., time sharing) so that a given optical signal is only transmitted for a fraction of time period on the specific $\lambda$, reserving the remainder of the $\lambda$ for other optical signals. Assigning a $\lambda$ to a physical connection out of a plurality of available $\lambda$s while assigning the rest of the plurality of $\lambda$s to the rest of physical connections is referred to as wavelength division multiplexing and/or frequency division multiplexing. By employing wavelength division multiplexing and time division multiplexing, a large number of connections can share a common optical link at the physical layer while being treated as unique links by the network layer. As such, the T-SDNC 230 may automatically create a physical layer connection to implement a requested network layer connection without input from system administrators. Further, the T-SDNC 230 may delete an existing physical layer connection to remove an existing network layer connection based on the network layer adjacency requests. Additionally, the T-SDNC 230 may modify an existing physical layer connection based on information contained in the network layer adjacency requests by adding or removing all or part of one or more $\lambda$s assigned to the physical layer connection, thereby changing the available bandwidth for the associated network layer connection.

Figure 3:
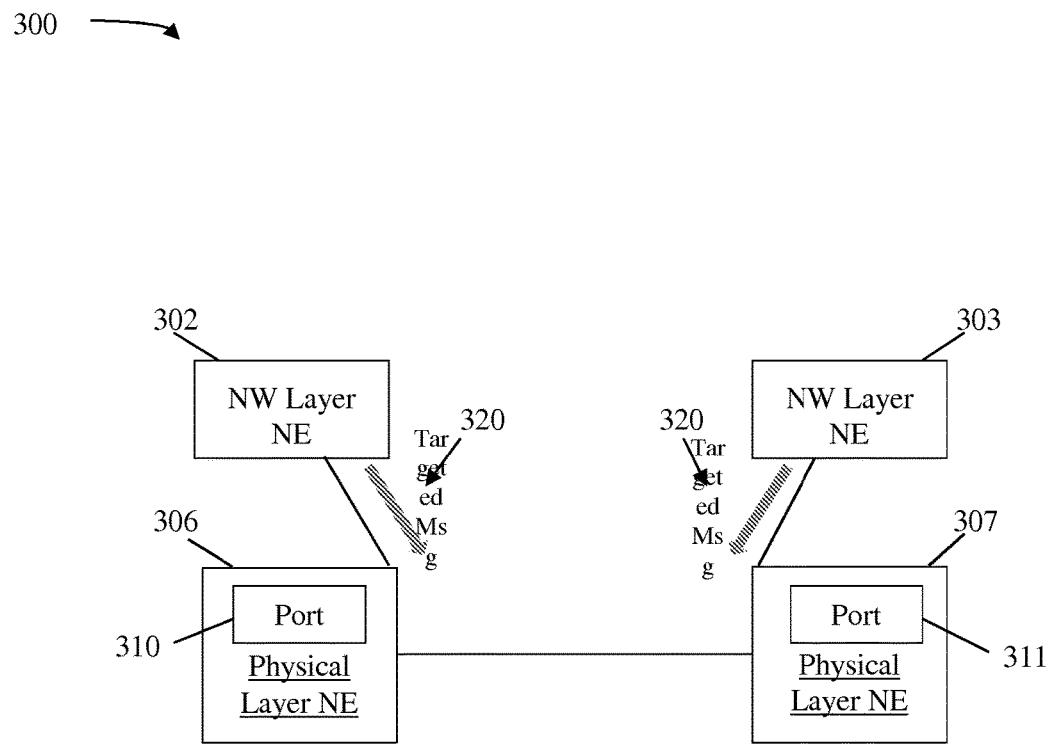
FIG. 3 is a schematic diagram of physical layer network elements inspecting network layer adjacency request messages.

FIG. 3 is a schematic diagram 300 of physical layer NEs 306-307 inspecting targeted messages 320 transmitted by network layer NEs 302-303. Network 300 comprises network layer NEs 302 and 303 and physical layer NEs 306 and 307, which may be substantially similar to network layer NEs 102 and 103 and physical layer NEs 104, 105, and 106, respectively. The port 310 is part of the physical layer NE 306 and the port 311 is part of the physical layer NE 307 respectively. Network layer NE 302 transmits a targeted message 320 toward network layer NE 303. Network layer NEs 302 and 303 are not yet communicatively coupled. The physical layer NE 306 and the physical layer NE 307 may each inspect the targeted message 320 as the message traverses the physical layer NEs. The targeted message 320 may be a network layer adjacency request message, for example a targeted OSPF hello message, a targeted IS-IS hello message, a targeted BGP hello message, etc. The physical layer NE 306 and the physical layer NE 307 may inspect header information of the targeted message 320 forwarded across a port 310 and a port 311, respectively.

By inspecting header information of the targeted messages 320, the physical layer NE 306 determines that the network layer NE 302 requests a network layer connection with the network layer NE 303 and the physical layer NE 307 determines that the network layer NE 303 requests a network layer connection with the network layer NE 302. Then the physical layer NE 306 transmits an advertisement message, such as an LSA, at the physical layer comprising identification information of the physical layer NE 306, identification information of the network layer NE 302, and/or identification information of the network layer NE 303. This advertisement message also comprises network layer adjacency request information transmitted by the network layer NE 302 for a network layer connection between the network layer NE 302 and the network layer NE 303. Similarly, the physical layer NE 307 transmits an advertisement message at the physical layer comprising identification information of the physical layer NE 307, identification information of the network layer NE 303, and/or identification information of the network layer NE 302. This advertisement message also comprises network layer adjacency request information transmitted by the network layer NE 303 for a network layer connection between the network layer NE 303 and the network layer NE 302. The advertisements may be employed by a T-SDNC, such as T-SDNC 110 or 230 to support creation of a physical layer connection between the physical layer NE 306 and the physical layer NE 307 to implement a network layer connection between the network layer NE 302 and the network layer NE 303, as requested.

Figure 4:
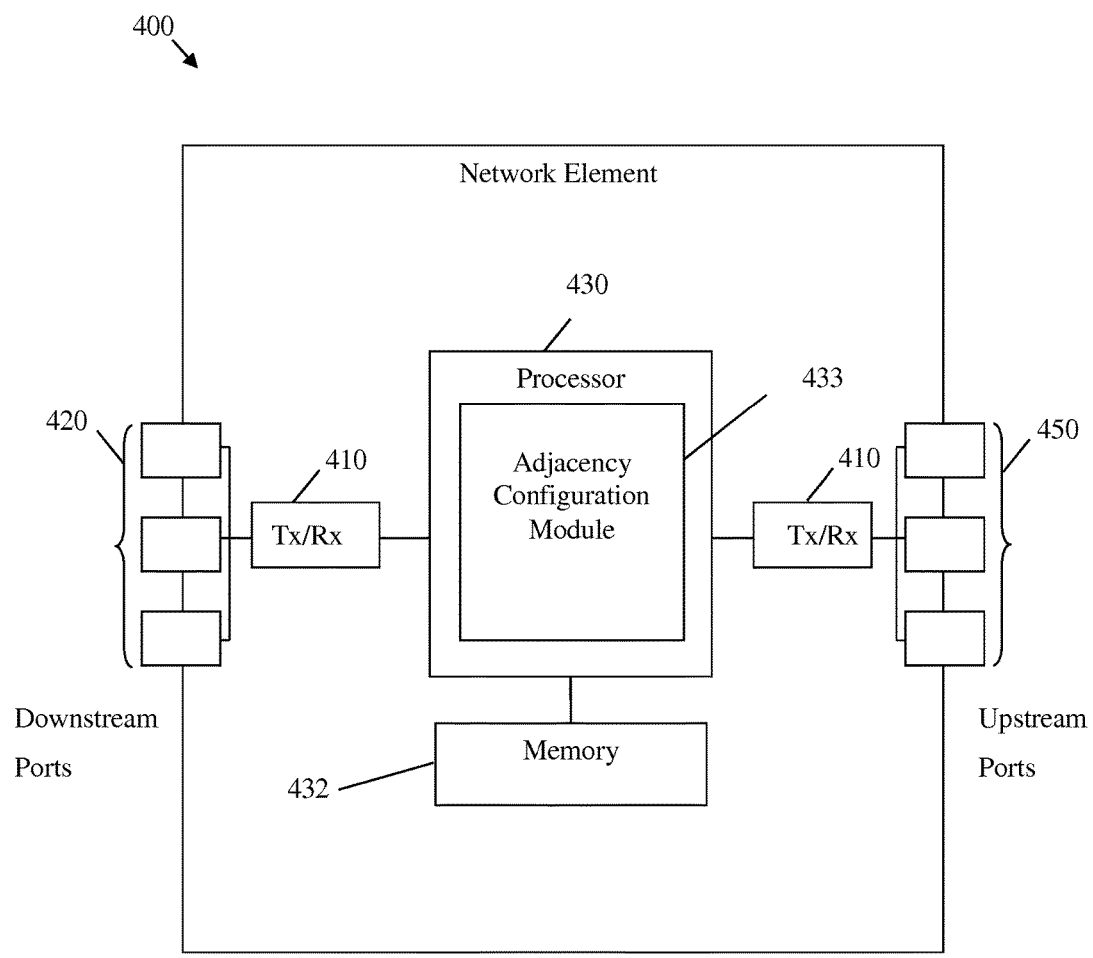
FIG. 4 is a schematic diagram of an embodiment of a network element (NE).

FIG. 4 is a schematic diagram of an embodiment of a network element (NE) 400, which may act as an SDNC (e.g. T-SDNC 110 and/or 230) or a network device (e.g. physical layer NEs 104-106, 210-213, 306-307 or a network layer NEs 102-103, 202-205, or 302-303, etc.) in an SDN domain. NE 400 may be configured to determine routes and/or links in an SDN domain that are visible to other interconnected SDN domains, generate SDN specific topology information, broadcast (e.g. advertise) the SDN specific topology information to the interconnected SDN domains, and/or setup a physical layer connection to implement a network layer connection, depending on the embodiment. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 400. For instance, the features/methods in the disclosure may be implemented using hardware, firmware, and/or software installed to run on hardware.

As shown in FIG. 4, the NE 400 may comprise transceivers (Tx/Rx) 410, which may be transmitters, receivers, or combinations thereof. A Tx/Rx 410 may be coupled to plurality of downstream ports 420 for transmitting and/or receiving frames from other nodes and a Tx/Rx 410 may be coupled to plurality of upstream ports 450 for transmitting and/or receiving frames from other nodes, respectively. A processor 430 may be coupled to the Tx/Rx 410 to process the frames and/or determine which nodes to send the frames to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs).

Processor 430 may comprise an adjacency configuration module 433, which may implement an adjacency request message inspecting method 500 and/or an adjacency configuration method 600 as discussed more fully below. In an alternative embodiment, the adjacency configuration module 433 may be implemented as instructions stored in the memory devices 432, which may be executed by processor 430. The memory device 432 may comprise a cache for temporarily storing content, e.g., a Random Access Memory (RAM). Additionally, the memory device 432 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 400, at least one of the processor 430 and/or memory device 432 are changed, transforming the NE 400 in part into a particular machine or apparatus, e.g., an adjacency configuration architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
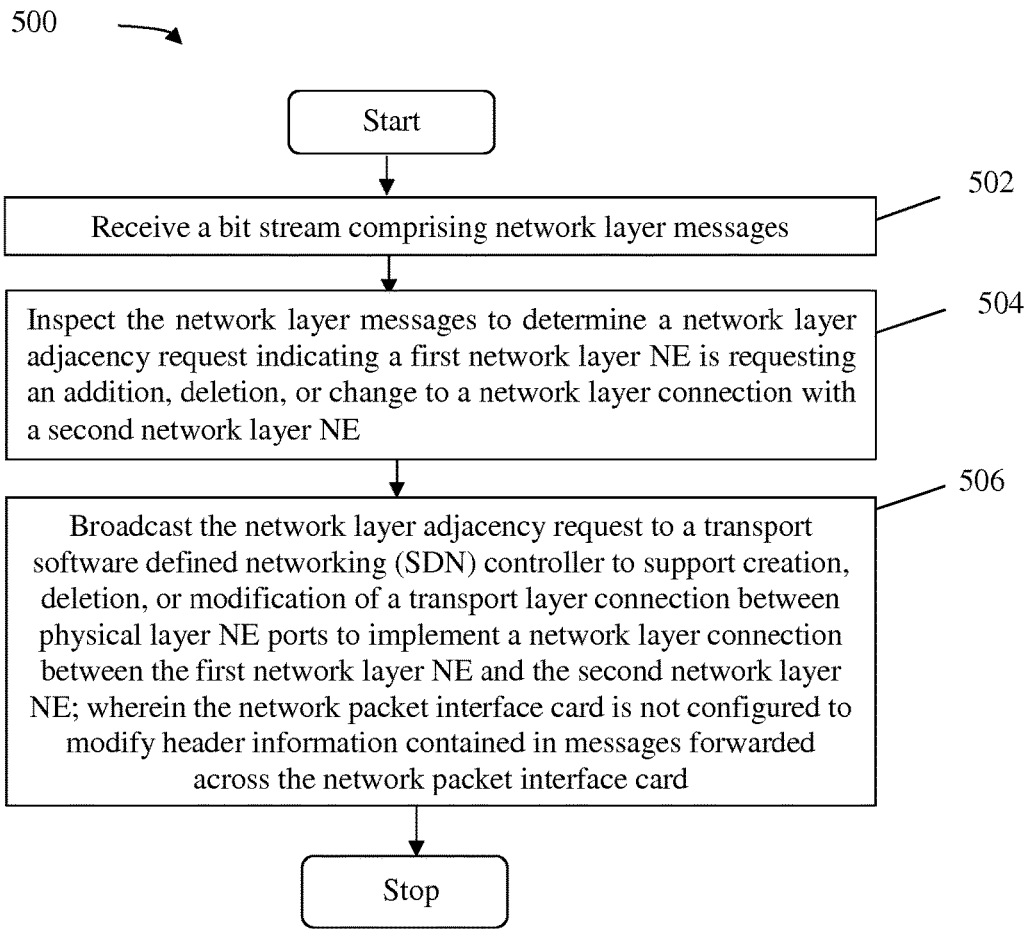
FIG. 5 is a flowchart of an embodiment of a method for inspecting adjacency request messages.

FIG. 5 is a flowchart of an embodiment of a method 500 for inspecting adjacency request messages, for example when a network layer NE requests creation, modification, and/or deletion of a network layer connection. Method 500 may be implemented in a physical layer NE, such as physical layer NEs 104-106, 210-213, or 306-307. At step 502, method 500 receives a bit stream comprising network layer messages. The network layer messages comprise network adjacency request messages and/or network layer maintenance messages. At step 504, method 500 inspects the network layer messages to determine a network layer adjacency request indicating a first network layer NE (e.g., network layer NE 102, 103, 204, 205, 302, or 303) is requesting an addition, deletion, or change to a network layer connection with a second network layer NE (e.g., network layer NE 103, 102, 205, 204, 303, or 302). At step 506, method 500 broadcasts the network layer adjacency request to a transport software defined networking (SDN) controller (e.g., T-SDNC 110 or 230) to support creation, deletion, or modification (e.g. addition or deletion of all or a time division portion of a lambda) of a transport layer connection between physical layer NE ports (e.g., physical layer NE port 215, 216, 310, or 311) to implement a network layer connection between the first network layer NE and the second network layer NE. The inspecting of method 500 may be performed by a network packet interface card that is not configured to modify header information contained in messages forwarded across the network packet interface card. As such, the network packet interface card is configured to communicate at the physical layer (e.g., OSI layer 1 and 0), but not at the network layer (e.g., OSI layer 3). Accordingly, method 500 makes physical layer changes automatically based on network layer requests.

Figure 6:
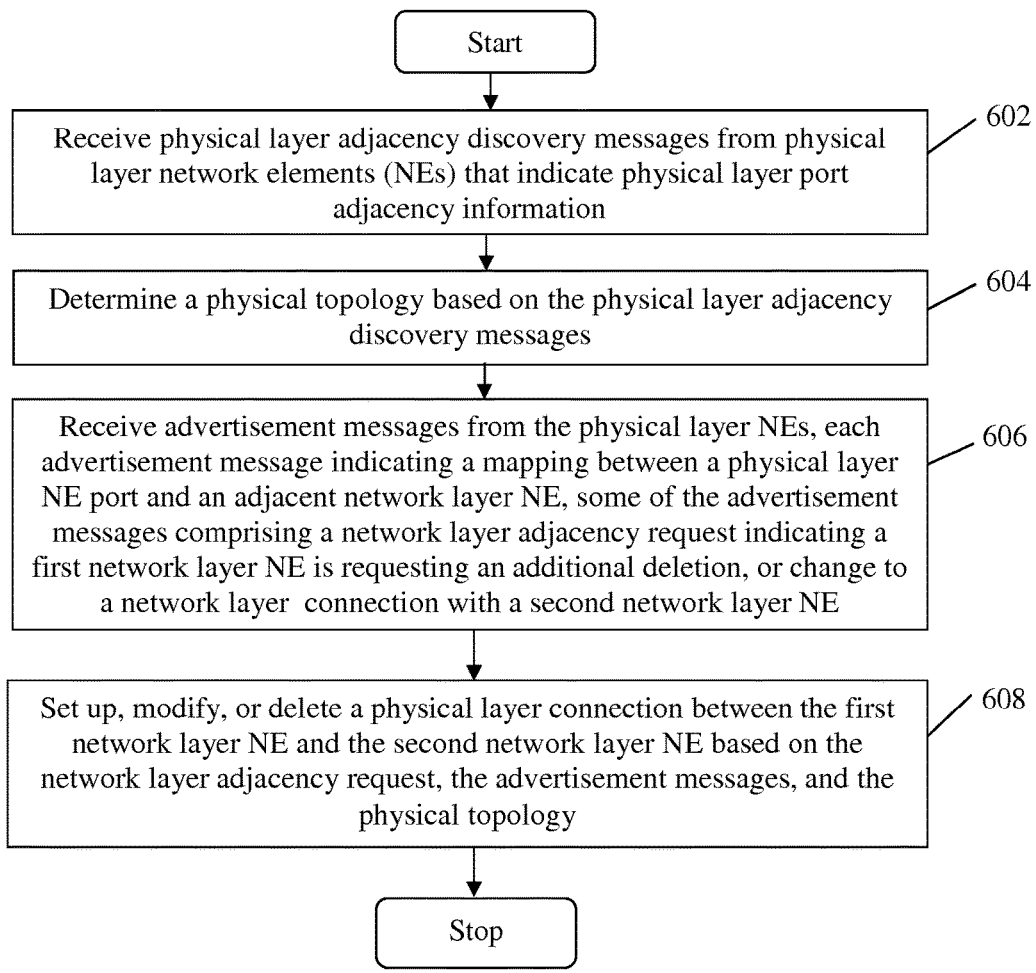
FIG. 6 is a flowchart of an embodiment of a method for configuring network layer adjacencies.

FIG. 6 is a flowchart of an embodiment of a method 600 for configuring network layer adjacencies, for example when a network layer NE requests creation, modification, and/or deletion of a network layer connection. Method 600 may be implemented in a T-SDNC, such as T-SDNC 110 or 230. At step 602, method 600 receives physical layer adjacency discovery messages (e.g., broadcast messages 120 or 220) from physical layer network elements (NEs) (e.g., physical layer network elements 104-106, 210-213, or 306-307) that indicate physical layer port adjacency information. At step 604, method 600 determines a physical topology based on the physical layer adjacency discovery messages.

At step 606, method 600 receives advertisement messages from the physical layer NEs, each advertisement message indicating a mapping between a physical layer NE port (e.g., physical layer NE port 215-216, see FIG. 2) and an adjacent network layer NE (e.g., network layer NEs 102-103, 202-205, or 302-303), some of the advertisement messages comprising a network layer adjacency request indicating a first network layer NE is requesting a creation, deletion, or modification of a network layer connection with a second network layer NE.

At step 608, method 600 sets up, deletes, or modifies a physical layer connection between the first network layer NE and the second network layer NE based on the network layer adjacency request, the advertisement messages, and the physical topology. For example, method 600 sets up a physical layer connection between a first physical layer NE port this is adjacent to the first network layer NE and a second physical layer NE port that is adjacent to the second network layer NE, respectively, (e.g. by assigning a wavelength and/or a time slot for the physical layer connection) to implement the network layer connection between the first network layer NE and the second network layer NE. As another example, method 600 deletes an existing physical layer connection between a first physical layer NE port that is adjacent to the first network layer NE and a second physical layer NE port that is adjacent to the second network layer NE, respectively, (e.g. by de-allocating a wavelength and/or a time slot for the physical layer connection) to delete a network layer connection between the first network layer NE and the second network layer NE. As another example, method 600 modifies an existing physical layer connection between a first physical layer NE port that is adjacent to the first network layer NE and a second physical layer NE port that is adjacent to the second network layer NE, respectively, to change a network layer connection between the first network layer NE and the second network layer NE. For example, modification of an existing physical layer connection may include adding or deleting a lambda, part of a lambda, and/or a time slot to increase or decrease, respectively, bandwidth of the physical layer connection and the associated network layer connection.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A transport software defined networking (SDN) controller, comprising:
a processor configured to determine a physical topology of a network based on physical layer adjacency discovery messages received from physical layer network elements (NEs), the physical layer NEs comprising a first physical layer NE and a second physical layer NE, the first physical layer NE being associated with a first network layer NE, the second physical layer NE being associated with a second network layer NE;
a receiver coupled to the processor and configured to receive an advertisement message from the first physical layer NE after determining the physical topology of the network and before a physical layer connection is established between the first physical layer NE and the second physical layer NE, the first physical layer NE and the second physical layer NE operating as optical switches, the advertisement message comprising a mapping and a network layer adjacency request, the mapping indicating that a first port of the first physical layer NE is adjacent to the second network layer NE, the network layer adjacency request comprising a request to set up a physical layer connection between the first network layer NE and the second network layer NE, the network layer adjacency request comprising an identification of the first network layer NE and an identification of the second network layer NE; and a transmitter coupled to the processor and configured to transmit control messages to the first physical layer NE and the second physical layer NE via the transmitter, the control messages indicating a physical layer connection setup between the first network layer NE and the second network layer NE via the first physical layer NE and the second physical layer NE based on the mapping included in the advertisement message, the network layer adjacency request included in the advertisement message, and the physical topology, wherein the physical layer connection setup between the first network layer NE and the second network layer NE comprises an assignment of at least one of a lambda (λ) between the first port of the first physical layer NE and a second port of the second physical layer NE or a timeslot for an optical signal between the first port of the first physical layer NE and the second port of the second physical layer NE.

2. The transport SDN controller of claim 1, wherein the receiver is further configured to receive a second advertisement message from the second physical layer NE comprising a second network layer adjacency request indicating the second network layer NE is requesting deletion of a second network layer connection with a third network layer NE, the transmitter being further configured to transmit second control messages to the second physical layer NE and a third physical layer NE associated with the third network layer NE, wherein the second control messages indicate a physical layer connection deletion between the second network layer NE and the third network layer NE via the second physical layer NE and the third physical layer NE based on the mapping included in the advertisement message, the network layer adjacency request included in the advertisement message, and the physical topology.

3. The transport SDN controller of claim 2, wherein the transport SDN controller determines a relationship between a logical topology and the physical topology based on the advertisement messages from the first physical layer NE and the second physical layer NE.

4. The transport SDN controller of claim 1, wherein the receiver is further configured to receive a second advertisement message from the second physical layer NE comprising a second network layer adjacency request indicating the second network layer NE is requesting modification of a second network layer connection with a third network layer NE, the transmitter being further configured to transmit second control messages to the second physical layer NE and a third physical layer NE associated with the third network layer NE, the second control messages indicating a request to modify a bandwidth associated with a physical layer connection between the second physical layer NE and the third physical layer NE based on the second network layer adjacency request, the second advertisement message, and the physical topology.

5. The transport SDN controller of claim 1, wherein the mapping and the network layer adjacency request are received by the transport SDN controller in a link state advertisement (LSA) message.

6. The transport SDN controller of claim 5, wherein the LSA message comprises an identification of the first physical layer NE, a first physical layer NE port identification, and an identification of network layer NEs adjacent to the first physical layer NE.

7. The transport SDN controller of claim 1, wherein the transport SDN controller communicates in network transport layer messages, wherein the network transport layer messages are communicated in open systems interconnection (OSI) layer 0 and OSI layer 1 protocols.

8. A method implemented in a physical layer network packet interface of a network, comprising:

receiving, at the physical layer network packet interface, a bit stream comprising a network layer message after determining a physical topology of the network, the network layer message comprising a network layer adjacency request and a mapping, the network layer adjacency request comprising a request for a network layer connection between a first network layer network element (NE) and a second network layer NE, the mapping indicating that a first port of a first physical layer NE is adjacent to the second network layer NE;

inspecting the network layer message to determine the network layer adjacency request before a physical layer connection is established between the first physical layer NE and a second physical layer NE, the first physical layer NE and the second physical layer NE operating as optical switches, the first physical layer NE being associated with the first network layer NE, the second physical layer NE being associated with the second network layer NE, the network layer adjacency request comprising an identification of the first network layer NE and an identification of the second network layer NE; and broadcasting, by the physical layer network packet interface, the network layer adjacency request to a transport software defined networking (SDN) controller to support creation of a first transport layer connection between a first physical layer NE port of the first physical layer NE and a second physical layer NE port of the second physical layer NE to implement a network layer connection between the first network layer NE and the second network layer NE, wherein the first transport layer connection comprises an assignment of at least one of a lambda (λ) between the first physical layer NE port and the second physical layer NE port or a timeslot for an optical signal between the first physical layer NE port and the second physical layer NE port.

9. The method of claim 8, wherein the network packet interface is not configured to modify header information contained in messages forwarded across the network packet interface.

10. The method of claim 8, further comprising inspecting headers of the network layer messages to obtain adjacency information of the first port of the physical layer NE and the second network layer NE in order to map the first port of the physical layer NE to the second network layer NE.

11. The method of claim 10, wherein inspecting comprises forwarding an encoded data packet from the first port to a second port without making modification to a header of the encoded data packet, the network layer adjacency request being broadcasted to the transport SDN controller in a link state advertisement (LSA) message.

12. The method of claim 8, further comprising:

inspecting the network layer message to determine a second network layer adjacency request indicating a third network layer NE is requesting deletion of a second network layer connection with a fourth network layer NE, a third physical layer NE being associated with the third network layer NE, a fourth physical layer NE being associated with the fourth network layer NE; and broadcasting, by the physical layer network packet interface, the second network layer adjacency request to the transport SDN controller to support deletion of a second transport layer connection between a third physical layer NE port of the third physical layer NE and a fourth physical layer NE port of the fourth physical layer NE to delete the second network layer connection between the third network layer NE and the fourth network layer NE.

13. The method of claim 8, further comprising:

inspecting the network layer message to determine a second network layer adjacency request indicating a third network layer NE is requesting modification of a second network layer connection with a fourth network layer NE, a third physical layer NE being associated with the third network layer NE, a fourth physical layer NE being associated with the fourth network layer NE; and broadcasting, by the physical layer network packet interface, the second network layer adjacency request to the transport SDN controller to support modification of a second transport layer connection between a third physical layer NE port of the third physical layer NE and a fourth physical layer NE port of the fourth physical layer NE to modify a bandwidth associated with the second network layer connection between the third network layer NE and the fourth network layer NE.

14. A method implemented by a transport software defined networking (SDN) controller of a network, comprising:

receiving physical layer adjacency discovery messages from physical layer network elements (NEs), the physical layer adjacency discovery messages indicating physical layer port adjacency information, the physical layer NEs comprising a first physical layer NE and a second physical layer NE, the first physical layer NE being associated with a first network layer NE, the second physical layer NE being associated with a second network layer NE;

determining a physical topology based on the physical layer adjacency discovery messages;

receiving an advertisement message from the first physical layer NE after determining the physical topology of the network and before a physical layer connection is established between the first physical layer NE and the second physical layer NE, the first physical layer NE and the second physical layer NE operating as optical switches, the advertisement message comprising a mapping and a network layer adjacency request, the mapping indicating that a first port of the first physical layer NE is adjacent to the second network layer NE, the network layer adjacency request comprising a request to set up a physical layer connection between the first network layer NE and the second network layer NE, the network layer adjacency request comprising an identification of the first network layer NE and an identification of the second network layer NE; and setting up the physical layer connection between the first network layer NE and the second network layer NE by assigning at least one of a lambda ($\lambda$) between the first port of the first physical layer NE and a second port of the second physical layer NE or a timeslot for an optical signal between the first port of the first physical layer NE and the second port of the second physical layer NE.

15. The method of claim 14, wherein the transport SDN controller operates upon communications occurring across a network transport layer, and wherein the network transport layer comprises open systems interconnection (OSI) layer 0 and OSI layer 1 protocols.

16. The method of claim 14, further comprising deleting the physical layer connection between the first network layer NE and the second network layer NE upon determining a deletion has been requested at a network layer based on a determined physical topology, a second network layer adjacency request, and a second advertisement message.

17. The method of claim 14, further comprising modifying a wavelength assignment for the physical layer connection between the first network layer NE and the second network layer NE upon determining a bandwidth modification has been requested at a network layer based on a determined physical topology, a second network layer adjacency request, and a second advertisement message.

18. The method of claim 14, further comprising modifying a timeslot assignment for the physical layer connection between the first network layer NE and the second network layer NE upon determining a bandwidth modification has been requested at a network layer based on a determined physical topology, a second network layer adjacency request, and a second advertisement message.

* * * * *